(12) United States Patent
Hu et al.

(10) Patent No.: US 10,955,063 B2
(45) Date of Patent: Mar. 23, 2021

(54) PNEUMATIC AMPLIFIER (71) Applicant: MERCURY INSTRUMENTS (CHENGDU) CORPORATION, Chengdu (CN)

(72) Inventors: Zhengchao Hu, Chengdu (CN); Keyang Lei, Chengdu (CN)

(73) Assignee: MERCURY INSTRUMENTS (CHENGDU) CORPORATION, Chengdu (CN)

( * ) Notice: Subject to any disclaimer, the term of this patent is extended or adjusted under 35 U.S.C. 154(b) by 115 days.

(21) Appl. No.: 16/470,258

(22) PCT Filed: Sep. 30, 2018

(86) PCT No.: PCT/CN2018/109042
§ 371 (c)(1),
(2) Date: Jun. 17, 2019

(87) PCT Pub. No.: WO2020/042277
PCT Pub. Date: Mar. 5, 2020

(65) Prior Publication Data
US 2021/0025515 A1    Jan. 28, 2021

(30) Foreign Application Priority Data
Aug. 27, 2018  (CN) .......................... 201810982151.X (51) Int. Cl.
*F16K 31/126*    (2006.01)
(52) U.S. Cl.
CPC ................................ *F16K 31/1268* (2013.01)

(58) Field of Classification Search
None
See application file for complete search history.

(56) References Cited

U.S. PATENT DOCUMENTS

| 3,618,891 A | 11/1971 | Topfer et al. |
| 4,522,220 A * | 6/1985 | Multrus ............... F15B 5/00 137/85 |

(Continued)

FOREIGN PATENT DOCUMENTS

| CH | 567663 A5 | 10/1975 |
| CN | 105485374 A | 4/2016 |
| CN | 106352124 A | 1/2017 |

*Primary Examiner* — Daphne M Barry
(74) *Attorney, Agent, or Firm* — Bayramoglu Law Offices LLC (57) ABSTRACT

A pneumatic amplifier includes a valve body, a first comparison chamber, a third comparison chamber and a second comparison chamber. A first diaphragm and a second diaphragm are arranged in the first comparison chamber and fixed to the valve body. A mounting plate A is fixedly arranged between the first diaphragm and the second diaphragm. A seventh diaphragm, an eighth diaphragm, a ninth diaphragm and a tenth diaphragm are arranged in the second comparison chamber and fixedly arranged on the valve body. A mounting plate C is fixedly arranged among the seventh diaphragm, the eighth diaphragm, the ninth diaphragm and the tenth diaphragm. A third diaphragm, a fourth diaphragm, a fifth diaphragm and a sixth diaphragm are arranged in the third comparison chamber and fixed to the valve body. A mounting plate B is fixedly arranged among the third diaphragm, the fourth diaphragm, the fifth diaphragm and the sixth diaphragm.

10 Claims, 4 Drawing Sheets (56) References Cited

U.S. PATENT DOCUMENTS

| | | | | |
|---|---|---|---|---|
| 4,828,218 | A | * | 5/1989 | Medlock ............... B05B 12/088 |
| | | | | 118/663 |
| 5,595,209 | A | * | 1/1997 | Atkinson ........... G05D 16/0672 |
| | | | | 137/116.5 |
| 6,019,121 | A | * | 2/2000 | Uehara .............. G05D 16/0672 |
| | | | | 137/116.5 |
| 2008/0110506 | A1 | * | 5/2008 | Igarashi ............... G05D 16/185 |
| | | | | 137/488 |
| 2009/0283152 | A1 | * | 11/2009 | Mason ............... G05D 16/0672 |
| | | | | 137/116.3 |
| 2013/0074956 | A1 | * | 3/2013 | Okitsu ................ G05D 16/163 |
| | | | | 137/505 |
| 2019/0079545 | A1 | * | 3/2019 | Yoo ...................... G05D 16/166 |

\* cited by examiner

PNEUMATIC AMPLIFIER

CROSS REFERENCE TO THE RELATED APPLICATIONS

This application is the national phase entry of International Application No. PCT/CN2018/109042, filed on Sep. 30, 2018, which is based upon and claims priority to Chinese Patent Application No. 201810982151.X, filed on Aug. 27, 2018, the entire contents of which are incorporated herein by reference.

TECHNICAL FIELD

The present invention relates to the technical field of pneumatic amplifier structures, in particular to a pneumatic amplifier.

BACKGROUND

Figure 6:
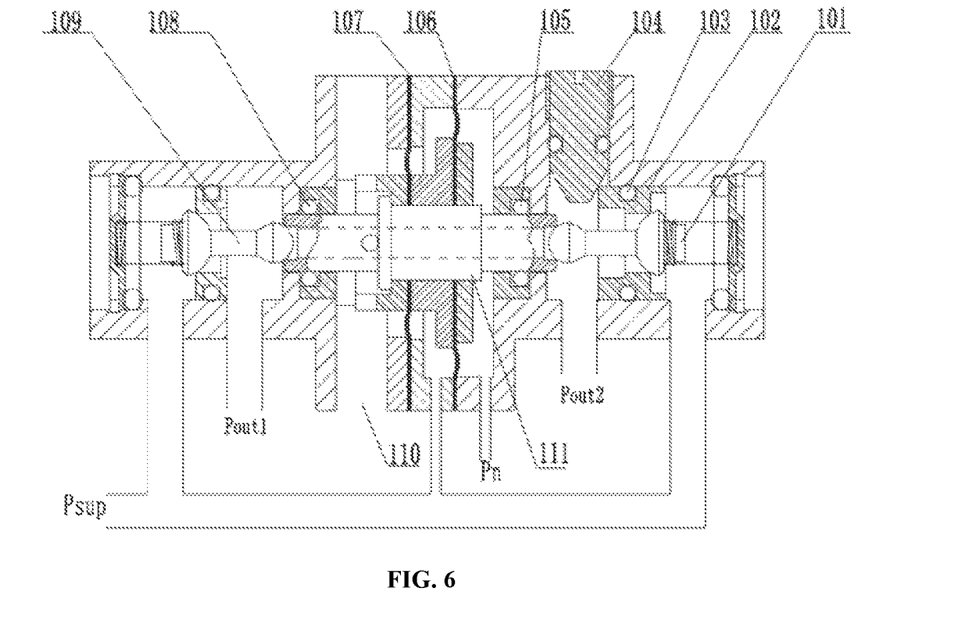
FIG. 6 is a schematic structural diagram of a traditional dual-acting amplifier.

FIG. 6 is a schematic structural diagram of a conventional double-acting amplifier. When the control pressure Pn is changed, a diaphragm 107 is forced to change to drive a valve stem 111 to move, and the valve stem 111 drives a valve core 101/109 to move to change the output pressure of Pout1 and Pout2.

When Pn increases, the diaphragm 106/107, under the combined action of Pn and Psup, drives the valve stem 111 to move to the left, and the valve core 109 to move to the left, an intake valve port of Pout1 is opened, a deflation valve port of Pout1 is closed, and the Pout1 pressure is increased. Meanwhile, the valve core 101 also moves to the left, an intake valve port of Pout2 is closed, a deflation valve port of Pout2 is opened, and the Pout2 pressure is lowered.

When Pn decreases, the diaphragm 106/107, under the combined actin of Pn and Psup, drives the valve stem 111 to move to the right, and the valve core 109 to move to the right, the intake valve port of Pout1 is closed, the deflation valve port of Pout1 is opened, and the Pout1 pressure is lowered. Meanwhile, the valve core 101 also moves to the right, an intake valve port of Pout2 is opened, the deflation valve port of Pout2 is closed, and the Pout2 pressure is increased.

Assuming that the effective area of the diaphragm 106 is S1, the effective area of the diaphragm 107 is S2, the effective area of Pout1 acting on the valve stem 111 is S3, and the effective area of Pout2 acting on the valve stem 111 is S4, under ideal cases, a force balance equation of the valve stem is:

$$Pn*S1+Psup*S2+Pout2*S4=Pout1*S3+Psup*S1 \quad \text{Formula 1}$$

In general cases, S3=S4, S1>S2, the above equation may be simplified as:

$$Pout1-Pout2=[Pn*S1-Psup*(S1-S2)]/S3 \quad \text{Formula 2}$$

Equation 2 shows that the conventional double-acting amplifier can only control an output pressure difference, rather than the output pressure. To solve this problem, adjusting screws 104 are additionally arranged to adjust the output pressure when the output pressure difference is zero. Therefore, the two outputs of the double-acting amplifier interfere with each other and require manual adjustment.

When the amplifier is used in a single-acting mode, it is necessary to move a valve core mounting base 102 by means of the adjusting screws 104 to drive the valve core 102 out of contact with the valve stem 111. Therefore, when the conventional pneumatic amplifier is used in different modes of single and double actions, the adjustment points of the amplifier are different and require manual re-adjustment.

The above problems make it impossible for the pneumatic amplifier to switch between single-acting and double-acting operating modes at the working site. Adjustments can only be made at a factory.

Since the sealing of the valve stem 111 relies on an O-ring 103/108, the friction force is large during normal operation, resulting in a long response time of the pneumatic amplifier and a serious hysteresis.

SUMMARY

Technical Problem

An objective of the present invention is to overcome the shortcomings of the prior art and to provide a pneumatic amplifier with high sensitivity, good repeatability, no sudden change in output pressure, no need to adjust the balance position after assembly, and compact structure.

The objective of the present invention is achieved by the following technical solution: a pneumatic amplifier comprises a valve body, and a first comparison chamber, a third comparison chamber and a second comparison chamber which are arranged in the valve body in sequence from left to right; a first diaphragm and a second diaphragm are arranged in the first comparison chamber in sequence from left to right and fixed to the valve body, and a mounting plate A is fixedly arranged between the first diaphragm and the second diaphragm; a positive-acting output cavity is formed between the first diaphragm and the left sidewall of the first comparison chamber; a positive-acting control cavity is formed between the second diaphragm and the right sidewall of the first comparison chamber;

a third diaphragm, a fourth diaphragm, a fifth diaphragm and a sixth diaphragm are arranged in the third comparison chamber in sequence from left to right and fixed to the valve body, and a mounting plate B is fixedly arranged among the third diaphragm, the fourth diaphragm, the fifth diaphragm and the sixth diaphragm; a baffle is fixedly arranged on the left end surface of the mounting plate B; a positive-acting output feedback cavity is formed between the left sidewall of the third diaphragm and the left sidewall of the third comparison chamber; a control bias cavity is formed between the fourth diaphragm and the fifth diaphragm; a control cavity is formed between the sixth diaphragm and the right sidewall of the third comparison chamber;

a seventh diaphragm, an eighth diaphragm, a ninth diaphragm and a tenth diaphragm are arranged in the second comparison chamber in sequence from left to right and fixedly arranged on the valve body, and a mounting plate C is fixedly arranged among the seventh diaphragm, the eighth diaphragm, the ninth diaphragm and the tenth diaphragm; a negative-acting bias cavity is formed between the seventh diaphragm and the second comparison chamber; a negative-acting control cavity is formed between the eighth diaphragm and the ninth diaphragm; a negative-acting output cavity is formed between the tenth diaphragm and the right sidewall of the second comparison chamber;

a negative-acting output cavity control pressure passage is connected between the negative-acting control cavity and the negative-acting control cavity; a positive-acting output cavity output passage and a negative-acting output cavity output passage are arranged on the top of the valve body; an output pressure feedback passage, a negative-acting output cavity and a negative-acting output cavity output passage are connected between the positive-acting output feedback cavity and the positive-acting output cavity output passage; a nozzle which is opposite to the baffle is arranged between the first control chamber and the third control chamber;

A pressure control port, a left positive-acting gas source passage and a right positive-acting gas source passage are arranged at the bottom of the valve body; the pressure control port is communicated with a control cavity; a left intermediate cavity is arranged between the left positive-acting gas source passage and the positive-acting output cavity; the left intermediate cavity communicates the left positive-acting gas source passage with the positive-acting output cavity; a left valve core mounting base, a left spring and a left valve core are arranged in the left intermediate cavity; one end of the left spring is fixed to the left valve core mounting base, and the left valve core is fixed to the other end of the left spring; the left valve core extends into the positive-acting output cavity under the spring force of the left spring and is pressed against the mounting plate A; the left valve core is sleeved with a main control spring for controlling a pressure difference of the nozzle; one end of the main control spring is fixed to the left valve core, and the other end of the main control spring is fixed to the left sidewall of the first control cavity; a right intermediate cavity is arranged between the right positive-acting gas source passage and the negative-acting output cavity; the right intermediate cavity communicates the right positive-acting gas source passage and the negative-acting output cavity; the right intermediate cavity communicates the right positive-acting gas source passage and the negative-acting output cavity; a right valve core mounting base, a right spring and a right valve core are arranged in the right intermediate cavity; one end of the right spring is fixed to the right valve core mounting base, and the right valve core is fixed to the other end of the right spring; the right valve core extends into the positive-acting output cavity under the spring force of the right spring and is pressed against the mounting plate C;

the pneumatic amplifier further comprises a gas source passage located below the valve body; the gas source passage is provided with three branches, two of which are connected with the left positive-acting gas source passage and the right positive-acting gas source passage respectively, and the remaining one of which is communicated with the positive-acting control cavity through a throttle orifice.

The positive-acting output cavity output passage is located on the left side of the first comparison chamber, and the negative-acting output cavity output passage is located on the right side of the second comparison chamber.

The right sidewall of the second control cavity is provided with a small hole which is communicated with the right positive-acting gas source passage.

A first exhaust passage, a second exhaust passage, a third exhaust passage, a fourth exhaust passage and a fifth exhaust passage are arranged on the top of the valve body.

The first exhaust passage is communicated with a cavity defined by the first diaphragm and the second diaphragm.

The second exhaust passage is communicated with a cavity defined by the third diaphragm and the fourth diaphragm.

The third exhaust passage is communicated with a cavity defined by the fifth diaphragm and the sixth diaphragm.

The fourth exhaust passage is communicated with a cavity defined by the seventh diaphragm and the eighth diaphragm.

The fifth exhaust passage is communicated with a cavity defined by the ninth diaphragm and the tenth diaphragm.

A T-shaped passage is formed in a position, which is in contact with the left valve core, inside the mounting plate A. The T-shaped passage communicates the positive-acting output cavity and the first exhaust passage.

SOLUTION OF PROBLEMS

Technical Solution

The present invention is implemented according to the following techniques:

1. There are three comparison chambers in the present invention: the first output comparison chamber, the second output comparison chamber and the third control comparison chamber, wherein valve core movements of the three chambers are independent of each other, and positive-acting control and negative-acting control are independent of each other.

2. The first comparison chamber and the second comparison chamber realize amplification of the output pressure and the flow rate. The outputs of the two chambers are independent of each other and do not interference with each other, and require no re-adjustment during the conversion of a single-acting mode and a dual-acting mode.

3. The third comparison chamber adopts the nozzle and the baffle to realize internal feedback amplification, the fed-back and amplified pressure is simultaneously sent to the first comparison chamber and the second comparison chamber, and meanwhile the synchronous and fast response in the positive action and the negative action of the pneumatic amplifier is realized.

4. The diaphragm movement distance in the third comparison chamber is independent of the movement distances of the diaphragms of the first and second comparison chambers and the valve cores. The diaphragm movement distance in the third comparison chamber can be small, while the movement distances of the first and second comparisons and the valve cores are very large.

5. When the first comparison chamber is in pressure balance, the output valve core does not participate in the pressure comparison, which may simplify the diaphragm engineering calculation of the first comparison chamber.

6. A small hole is passed between the Ps/Po2, so that the output valve core does not participate in the pressure comparison when the pressure in the second comparation chamber is balanced, and the diaphragm engineering calculation of the second comparation chamber is simplified.

BENEFICIAL EFFECT OF THE INVENTION

Beneficial Effects

The present invention has the following advantages:

1. There are three comparison chambers in the present invention: the first output comparison chamber, the second output comparison chamber and the third control comparison chamber, wherein valve core movements of the three chambers are independent of each other, and positive-acting control and negative-acting control are independent of each other.

2. The first comparison chamber and the second comparison chamber realize amplification of the output pressure and the flow rate. The outputs of the two chambers are independent of each other and do not interference with each other, and require no re-adjustment during the conversion of a single-acting mode and a dual-acting mode.

3. The third comparison chamber adopts the nozzle and the baffle to realize internal feedback amplification, the fed-back and amplified pressure is simultaneously sent to the first comparison chamber and the second comparison chamber, and meanwhile the synchronous and fast response in the positive action and the negative action of the pneumatic amplifier is realized.

4. The diaphragm movement distance in the third comparison chamber is independent of the movement distances of the diaphragms of the first and second comparison chambers and the valve cores. The diaphragm movement distance in the third comparison chamber can be small, while the movement distances of the first and second comparisons and the valve cores are very large.

5. When the first comparison chamber is in pressure balance, the output valve core does not participate in the pressure comparison, which may simplify the diaphragm engineering calculation of the first comparison chamber.

6. A small hole is passed between the Ps/Po2, so that the output valve core does not participate in the pressure comparison when the pressure in the second comparation chamber is balanced, and the diaphragm engineering calculation of the second comparation chamber is simplified.

BRIEF DESCRIPTION OF THE DRAWINGS

In drawings, reference symbols represent the following components: 1-first diaphragm, 2-second diaphragm, 3-third diaphragm, 4-fourth diaphragm, 5-fifth diaphragm, 6-sixth diaphragm, 7-seventh diaphragm, 8-eight diaphragm, 9-ninth diaphragm, 10-ten diaphragm, 11-throttle orifice, 12-small hole, 13-left valve core, 14-right valve core, 15-left spring, 16-right spring, 17-main control spring, 18-left valve core mounting base, 19-right valve core mounting base, 20-output pressure feedback passage, 21-negative-acting output cavity control pressure passage, 22-positive-acting output cavity output passage, 23-negative-acting output cavity output passage, 24-right positive-acting gas source passage, 25-left positive-acting gas source passage, 26-nozzle, 27-baffle, 28-gas source passage, 30-first exhaust passage, 31-second exhaust passage, 32-third exhaust passage, 33-fourth exhaust passage, 34-fifth exhaust passage, 35-valve body, 36-mounting plate A, 37-positive-acting output cavity, 38-positive-acting control cavity, 39-mounting plate B, 40-positive-acting output feedback cavity, 41-control bias cavity, 42-control cavity, 43-mounting plate C, 44-negative-acting bias cavity, 45-negative-acting control cavity, 46-negative-acting output cavity, 47-pressure control port, 48-left intermediate cavity, 49-right intermediate cavity.

DETAILED DESCRIPTION

The present invention will be further described below in conjunction with the accompanying drawings, and the protection scope of the present invention is not limited to the followings:

Embodiment 1

Figure 1:
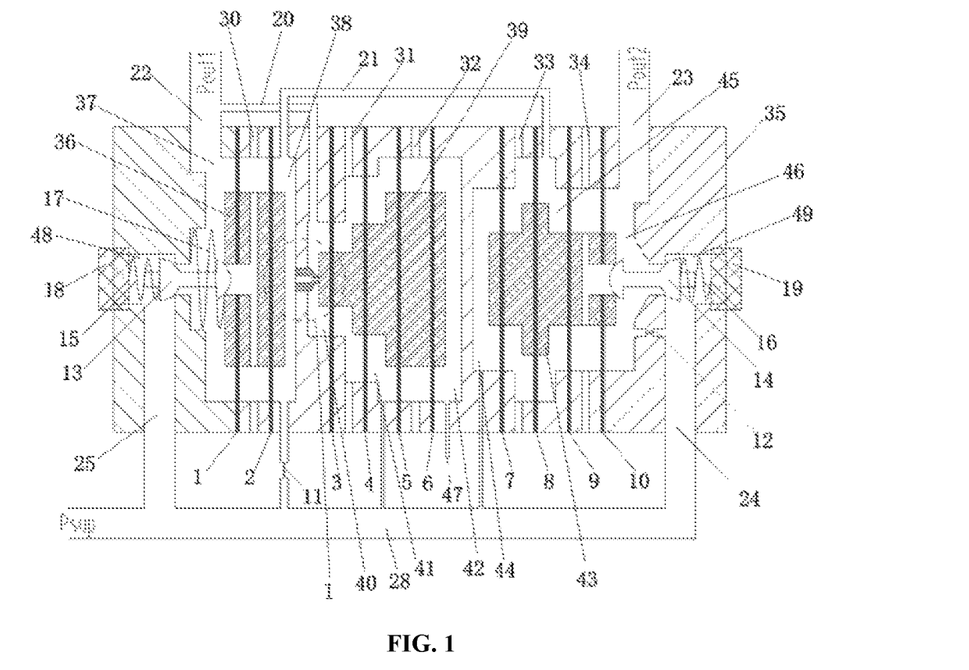
FIG. 1 is a schematic structural diagram of Embodiment 1 of the present invention.
Figure 2:
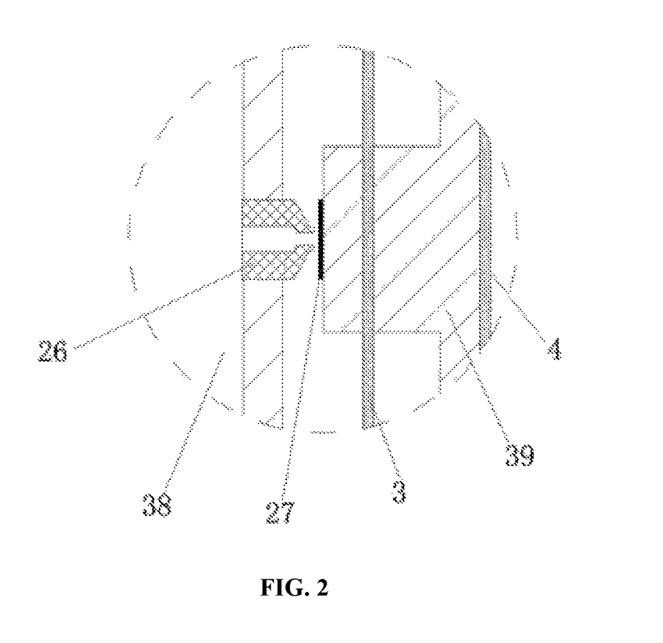
FIG. 2 is a locally enlarged view of part I in FIG. 1.

As shown in FIGS. 1-2, a pneumatic amplifier comprises a valve body 35, and a first comparison chamber, a third comparison chamber and a second comparison chamber which are arranged in the valve body 35 in sequence from left to right; a first diaphragm 1 and a second diaphragm 2 are arranged in the first comparison chamber in sequence from left to right and fixed to the valve body 35, and a mounting plate A 36 is fixedly arranged between the first diaphragm 1 and the second diaphragm 2; a positive-acting output cavity 37 is formed between the first diaphragm 1 and the left sidewall of the first comparison chamber; a positive-acting control cavity 38 is formed between the second diaphragm 2 and the right sidewall of the first comparison chamber;

a third diaphragm 3, a fourth diaphragm 4, a fifth diaphragm 5 and a sixth diaphragm 6 are arranged in the third comparison chamber in sequence from left to right and fixed to the valve body 35, and a mounting plate B 39 is fixedly arranged among the third diaphragm 3, the fourth diaphragm 4, the fifth diaphragm 5 and the sixth diaphragm 6; a baffle 27 is fixedly arranged on the left end surface of the mounting plate B 39; a positive-acting output feedback cavity 40 is formed between the left sidewall of the third diaphragm 3 and the left sidewall of the third comparison chamber; a control bias cavity 41 is formed between the fourth diaphragm 4 and the fifth diaphragm 5; a control cavity 42 is formed between the sixth diaphragm 6 and the right sidewall of the third comparison chamber;

a seventh diaphragm 7, an eighth diaphragm 8, a ninth diaphragm 9 and a tenth diaphragm 10 are arranged in the second comparison chamber in sequence from left to right and fixedly arranged on the valve body 35, and a mounting plate C 43 is fixedly arranged among the seventh diaphragm 7, the eighth diaphragm 8, the ninth diaphragm 9 and the tenth diaphragm 10; a negative-acting bias cavity 44 is formed between the seventh diaphragm 7 and the left sidewall of the second comparison chamber; a negative-acting control cavity 45 is formed between the eighth diaphragm 8 and the ninth diaphragm 9; a negative-acting output cavity 46 is formed between the tenth diaphragm 10 and the right sidewall of the second comparison chamber;

a negative-acting output cavity control pressure passage 21 is connected between the negative-acting control cavity 38 and the negative-acting control cavity 45; a positive-acting output cavity output passage 22 and a negative-acting output cavity output passage 23 are arranged on the top of the valve body 35; an output pressure feedback passage 20, a negative-acting output cavity 46 and a negative-acting output cavity output passage 23 are connected between the positive-acting output feedback cavity 40 and the positive-acting output cavity output passage 22; a nozzle 26 which is opposite to the baffle 27 is arranged between the first control chamber and the third control chamber;

A pressure control port 47, a left positive-acting gas source passage 25 and a right positive-acting gas source passage 24 are arranged at the bottom of the valve body 35; the pressure control port 47 is communicated with a control cavity 42; a left intermediate cavity 48 is arranged between the left positive-acting gas source passage 25 and the positive-acting output cavity 37; the left intermediate cavity 48 communicates the left positive-acting gas source passage 25 with the positive-acting output cavity 37; a left valve core mounting base 18, a left spring 15 and a left valve core 13 are arranged in the left intermediate cavity 48; one end of the left spring 15 is fixed to the left valve core mounting base 18, and the left valve core 13 is fixed to the other end of the left spring 15; the left valve core 13 extends into the positive-acting output cavity 37 under the spring force of the left spring 15 and is pressed against the mounting plate A 36; the left valve core 13 is sleeved with a main control spring 17 for controlling a pressure difference of the nozzle 26; one end of the main control spring 17 is fixed to the left valve core 13, and the other end of the main control spring 17 is fixed to the left sidewall of the first control chamber; a right intermediate cavity 49 is arranged between the right positive-acting gas source passage 24 and the negative-acting output cavity 46; the right intermediate cavity 49 communicates the right positive-acting gas source passage 24 and the negative-acting output cavity 46; the right intermediate cavity 49 communicates the right positive-acting gas source passage 24 and the negative-acting output cavity 46; a right valve core mounting base 19, a right spring 16 and a right valve core 14 are arranged in the right intermediate cavity 49; one end of the right spring 16 is fixed to the right valve core mounting base 19, and the right valve core 14 is fixed to the other end of the right spring 16; the right valve core 14 extends into the positive-acting output cavity 46 under the spring force of the right spring 16 and is pressed against the mounting plate C 43;

the pneumatic amplifier further comprises a gas source passage 28 located below the valve body 35; the gas source passage 28 is provided with three branches, two of which are connected with the left positive-acting gas source passage 25 and the right positive-acting gas source passage 24 respectively, and the remaining one of which is communicated with the positive-acting control cavity 38 through a throttle orifice 11.

The positive-acting output cavity output passage 22 is located on the left side of the first comparison chamber, and the negative-acting output cavity output passage 23 is located on the right side of the second comparison chamber.

The right sidewall of the second control chamber is provided with a small hole 12 which is communicated with the right positive-acting gas source passage 24.

A first exhaust passage 30, a second exhaust passage 31, a third exhaust passage 32, a fourth exhaust passage 33 and a fifth exhaust passage 34 are arranged on the top of the valve body 35. The first exhaust passage 30 is communicated with a cavity defined by the first diaphragm 1 and the second diaphragm 2. The second exhaust passage 31 is communicated with a cavity defined by the third diaphragm 3 and the fourth diaphragm 4. The third exhaust passage 32 is communicated with a cavity defined by the fifth diaphragm 5 and the sixth diaphragm 6. The fourth exhaust passage 33 is communicated with a cavity defined by the seventh diaphragm 7 and the eighth diaphragm 8. The fifth exhaust passage 34 is communicated with a cavity defined by the ninth diaphragm 9 and the tenth diaphragm 10.

A T-shaped passage is formed in a position, which is in contact with the left valve core 31, inside the mounting plate A 36. The T-shaped passage communicates the positive-acting output cavity 37 with the first exhaust passage 30.

It is assumed that the effective areas of the diaphragm 1, the diaphragm 2, the diaphragm 3, the diaphragm 4, the diaphragm 5, the diaphragm 6, the diaphragm 7, the diaphragm 8, the diaphragm 9, and the diaphragm 10 are S1, S2, S3, S4, S5, S6, S7, S8, S9 and S10; the control pressure corresponding to the pressure control port 47 is Pn; the gas source pressure in the gas source passage 28 is Psup; the positive-acting output cavity output passage 22 is communicated with the positive-acting output feedback cavity 40 and has the pressure of Pout1; the pressure of the positive-acting control cavity 38 is Pd;

in ideal cases, the force balance equation is as follows:

$$Pout1 * S3 + Psup * S5 = Pn * S6 + Psup * S4 \qquad (3)$$

If S6>S3, S5>S4, then the above equation is simplified as:

$$Pout1 = [Pn * S6 - Psup * (S5 - S4)] / S3 \qquad (4)$$

When the pressure Pn of the pressure control port 47 changes, the above balance is broken, the baffle 27 is moved under the driving of the diaphragm 3, the diaphragm 4, the diaphragm 5, the diaphragm 6, and the mounting plate B 39, and a gap between the baffle 27 and the nozzle 26 changes.

When the pressure Pn of the pressure control port 47 is increased, the diaphragm 3, the diaphragm 4, the diaphragm 5, the diaphragm 6, and the mounting plate B 39 are moved to the left, and the gap between the baffle 27 and the nozzle 26 is reduced. A nozzle baffle mechanism composed of the throttle orifice 11, the nozzle 26, and the baffle 27 causes a fast increase in the pressure Pd of the positive acting control cavity 38 to further drive the left valve core 13 to move to the left, so that a gas source gas in the gas source passage 28 is quickly introduced into the positive-acting output cavity 37 through the left positive-acting gas source passage 25, thereby causing a fast increase in the output pressure Pout1.

When the pressure Pn of the pressure control port 47 is decreased, the diaphragm 3, the diaphragm 4, the diaphragm 5, the diaphragm 6, and the mounting plate B 39 are moved to the right, and the gap between the baffle 27 and the nozzle 26 is increased. A nozzle baffle mechanism composed of the throttle orifice 11, the nozzle 26, and the baffle 27 causes a fast decrease in the pressure Pd of the positive-acting control cavity 38, the diaphragm 1 and the diaphragm 2 move to the right, such that a gas in the positive-acting output cavity 37 enters the first exhaust passage 30 through a passage inside the mounting plate A 36, and is finally released to the atmosphere by the first exhaust passage 30, so that the output pressure Pout1 is rapidly decreased.

Therefore, the internal feedback amplification is realized by the nozzle and the baffle, and the fed-back and amplified pressure is simultaneously sent to the first comparison chamber and the second comparison chamber, and synchronous and fast response of the positive action and the reverse action of the pneumatic amplifier is achieved, so that the pneumatic amplifier of the present invention has the characteristic of sensitivity in response.

The diaphragm structure in this embodiment is merely illustrative, and a flat diaphragm or a corrugated diaphragm may also be used.

Embodiment 2

Figure 3:
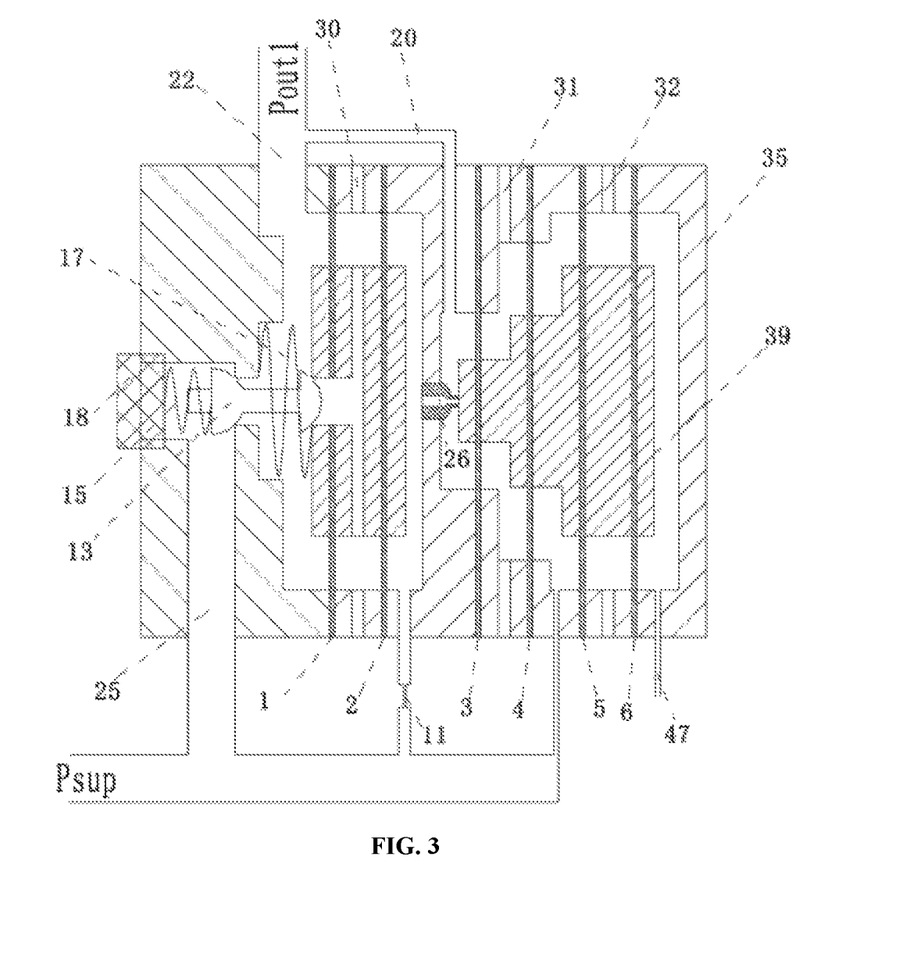
FIG. 3 is a schematic structural diagram of Embodiment 2 of the present invention.

As shown in FIG. 3, a pneumatic amplifier in this embodiment differs from Embodiment 1 in that: a single-acting amplifier may be formed by removing the second comparison chamber and the negative-acting output chamber control pressure passage 21 on the basis of Embodiment 1.

Embodiment 3

Figure 4:
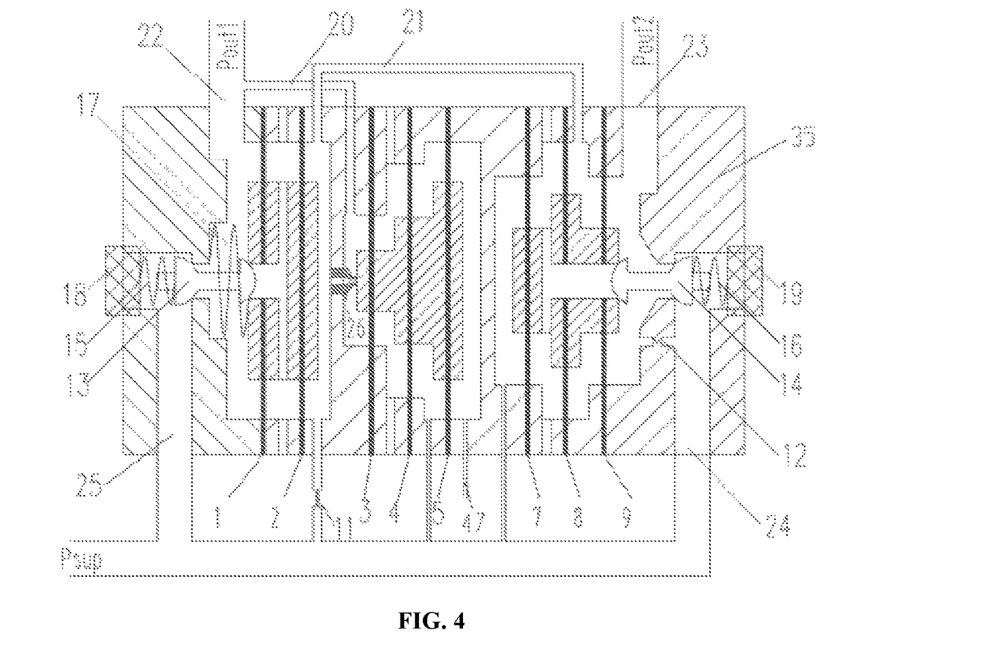
FIG. 4 is a schematic structural diagram of Embodiment 3 of the present invention.

As shown in FIG. 4, a pneumatic amplifier in this embodiment differs from Embodiment 1 in that: the sixth diaphragm 6, the tenth diaphragm 10 and corresponding chambers are removed on the basis of Embodiment 1, a dual-diaphragm comparison structure is changed into a single-diaphragm comparison structure, and the number of the diaphragms is decreased.

Embodiment 4

Figure 5:
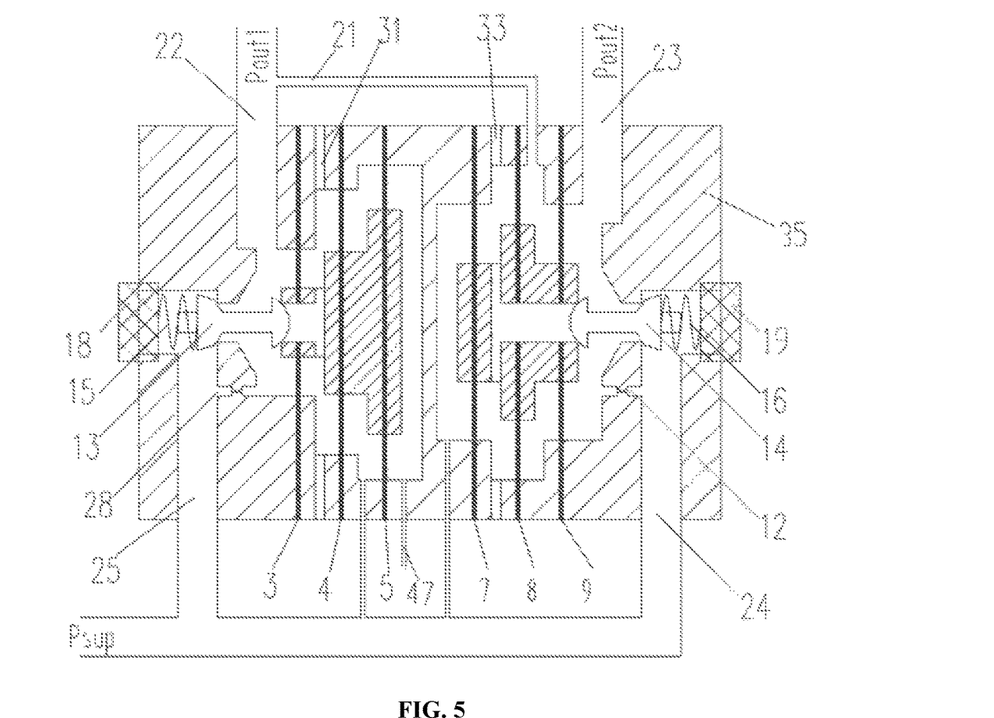
FIG. 5 is a schematic structural diagram of Embodiment 4 of the present invention.

As shown in FIG. 5, a pneumatic amplifier in this embodiment differs from Embodiment 1 in that: the nozzle 26 and the baffle 27 are removed on the basis of Embodiment 1; the sixth diaphragm 6 and the tenth diaphragm 10 are removed, and a dual-diaphragm comparison structure is changed into a single-diaphragm comparison structure; the throttle orifice 11 and the diaphragm 1/2/6/10 are removed; the positive-acting output cavity output passage 22 and the negative-acting output cavity control pressure passage 21 are integrated to further reduce the complexity of the pneumatic amplifier.

The response speed of the simplified pneumatic amplifier is decreased relative to Embodiment 1. However, the outputs of Pout1 and Pout2 still do not interfere with each other, and require no re-adjustment during the conversion of a single-acting mode and a dual-acting mode.

What is claimed is:
1. A pneumatic amplifier, comprising:
a valve body;
a first comparison chamber, a third comparison chamber and a second comparison chamber arranged in the valve body in sequence from left to right;
a first diaphragm and a second diaphragm arranged in the first comparison chamber in sequence from left to right and fixed to the valve body;
a first mounting plate fixedly arranged between the first diaphragm and the second diaphragm;
a positive-acting output cavity formed between the first diaphragm and a left sidewall of the first comparison chamber;
a positive-acting control cavity formed between the second diaphragm and a right sidewall of the first comparison chamber;
a third diaphragm, a fourth diaphragm, a fifth diaphragm and a sixth diaphragm arranged in the third comparison chamber in sequence from left to right and fixed to the valve body;
a second mounting plate fixedly arranged among the third diaphragm, the fourth diaphragm, the fifth diaphragm and the sixth diaphragm;
a baffle fixedly arranged on a left end surface of the second mounting plate;
a positive-acting output feedback cavity formed between a left sidewall of the third diaphragm and a left sidewall of the third comparison chamber;
a control bias cavity formed between the fourth diaphragm and the fifth diaphragm;
a control cavity formed between the sixth diaphragm and a right sidewall of the third comparison chamber;
a seventh diaphragm, an eighth diaphragm, a ninth diaphragm and a tenth diaphragm arranged in the second comparison chamber in sequence from left to right and fixedly arranged on the valve body;
a third mounting plate fixedly arranged among the seventh diaphragm, the eighth diaphragm, the ninth diaphragm and the tenth diaphragm;
a negative-acting bias cavity formed between the seventh diaphragm and a left sidewall of the second comparison chamber;
a negative-acting control cavity formed between the eighth diaphragm and the ninth diaphragm;
a negative-acting output cavity formed between the tenth diaphragm and a right sidewall of the second comparison chamber;
a negative-acting output cavity control pressure passage connected between the positive-acting control cavity and the negative-acting control cavity;
a positive-acting output cavity output passage and a negative-acting output cavity output passage arranged on a top of the valve body;
an output pressure feedback passage, the negative-acting output cavity and the negative-acting output cavity output passage are connected between the positive-acting output feedback cavity and the positive-acting output cavity output passage;
a nozzle opposite to the baffle arranged between the first control chamber and the third control chamber;
a pressure control port, a left positive-acting gas source passage and a right positive-acting gas source passage arranged at a bottom of the valve body;
the pressure control port communicates with the control cavity;
a left intermediate cavity arranged between the left positive-acting gas source passage and the positive-acting output cavity;
the left positive-acting gas source passage is connected to the positive-acting output cavity through the left intermediate cavity;
a left valve core mounting base, a left spring and a left valve core arranged in the left intermediate cavity;
wherein, one end of the left spring is fixed to the left valve core mounting base, and the left valve core is fixed to the other end of the left spring;
the left valve core extends into the positive-acting output cavity under a spring force of the left spring and is pressed against the first mounting plate;
the left valve core is sleeved with a main control spring for controlling a pressure difference of the nozzle;
one end of the main control spring is fixed to the left valve core, and an other end of the main control spring is fixed to the left sidewall of the first control chamber;
a right intermediate cavity is arranged between the right positive-acting gas source passage and the negative-acting output cavity;
the right positive-acting gas source passage is connected to the negative-acting output cavity-through the right intermediate cavity;
a right valve core mounting base, a right spring and a right valve core are arranged in the right intermediate cavity;
one end of the right spring is fixed to the right valve core mounting base, and the right valve core is fixed to an other end of the right spring;
the right valve core extends into the positive-acting output cavity under a spring force of the right spring and is pressed against the third mounting plate;
the pneumatic amplifier further comprises a gas source passage located below the valve body; the gas source passage is provided with three branches, two of the three branches are connected with the left positive-acting gas source passage and the right positive-acting gas source passage respectively, and remaining one of three branches communicates with the positive-acting control cavity through a throttle orifice.

2. The pneumatic amplifier according to claim 1, wherein the positive-acting output cavity output passage is located on the left side of the first comparison chamber, and the negative-acting output cavity output passage is located on the right side of the second comparison chamber.

3. The pneumatic amplifier according to claim 1, the right sidewall of the second control cavity is provided with a small hole communicating with the right positive-acting gas source passage.

4. The pneumatic amplifier according to claim 1, wherein a first exhaust passage, a second exhaust passage, a third exhaust passage, a fourth exhaust passage and a fifth exhaust passage are arranged on the top of the valve body.

5. The pneumatic amplifier according to claim 4, wherein the first exhaust passage communicates with a cavity defined by the first diaphragm and the second diaphragm.

6. The pneumatic amplifier according to claim 4, wherein the second exhaust passage communicates with a cavity defined by the first diaphragm and the second diaphragm.

7. The pneumatic amplifier according to claim 4, wherein the third exhaust passage communicates with a cavity defined by the first diaphragm and the second diaphragm.

8. The pneumatic amplifier according to claim 4, wherein the fourth exhaust passage communicates with a cavity defined by the first diaphragm and the second diaphragm.

9. The pneumatic amplifier according to claim 4, wherein the fifth exhaust passage communicates with a cavity defined by the first diaphragm and the second diaphragm.

10. The pneumatic amplifier according to claim 1, wherein a T-shaped passage is formed in a position in contact with the left valve core, inside the first mounting plate; the T-shaped passage connects the positive-acting output cavity with the first exhaust passage.

* * * * *